(12) United States Patent
Fodor et al.

(10) Patent No.: US 10,513,254 B2
(45) Date of Patent: Dec. 24, 2019

(54) METHODS AND SYSTEM PROVIDING VEHICLE DRIFT

(71) Applicant: Ford Global Technologies, LLC, Dearborn, MI (US)

(72) Inventors: Michael Glenn Fodor, Dearborn, MI (US); Kenneth James Miller, Canton, MI (US); Kevin Ray Ruybal, Canton, MI (US); Xiaoyong Wang, Novi, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 15/457,815

(22) Filed: Mar. 13, 2017

(65) Prior Publication Data
US 2018/0257631 A1 Sep. 13, 2018

(51) Int. Cl.
*B60W 20/10* (2016.01)
*B60L 15/20* (2006.01)
*B60W 20/30* (2016.01)
*B60L 50/16* (2019.01)

(52) U.S. Cl.
CPC .............. *B60W 20/10* (2013.01); *B60L 15/20* (2013.01); *B60L 15/2036* (2013.01); *B60L 15/2054* (2013.01); *B60L 50/16* (2019.02); *B60W 20/30* (2013.01); *B60L 2240/12* (2013.01); *B60L 2240/14* (2013.01); *B60L 2240/24* (2013.01); *B60L 2240/421* (2013.01); *B60L 2240/423* (2013.01); *B60L 2240/443* (2013.01); *B60L 2240/461* (2013.01); *B60L 2240/463* (2013.01); *B60L 2240/465* (2013.01); *B60L 2250/26* (2013.01); *B60L 2270/145* (2013.01); *B60W 2510/20* (2013.01); *B60W 2520/20* (2013.01); *B60W 2540/10* (2013.01); *B60W 2710/0666* (2013.01); *B60W 2710/083* (2013.01); *B60Y 2300/188* (2013.01); *B60Y 2400/112* (2013.01); *B60Y 2400/428* (2013.01);
(Continued)

(58) Field of Classification Search
CPC ....... B60G 17/018; B60W 30/04; B62D 5/04; B62D 6/00
USPC ..................... 701/41, 42, 43, 51, 90, 71, 74
See application file for complete search history.

(56) References Cited

U.S. PATENT DOCUMENTS

| 4,974,875 A | 12/1990 | Sugasawa et al. |
| 6,301,538 B1 * | 10/2001 | Kirchhoffer ........ F16H 61/0437 192/3.29 |
| 6,681,180 B2 | 1/2004 | Bevly et al. |

(Continued)

OTHER PUBLICATIONS

Zhao, Yanan, et al., "Methods and System for Hybrid Vehicle Regenerative Braking," U.S. Appl. No. 15/457,695, filed Mar. 13, 2017, 67 pages.

(Continued)

*Primary Examiner* — Thomas G Black
*Assistant Examiner* — Wae L Louie
(74) *Attorney, Agent, or Firm* — David Kelley; McCoy Russell LLP

(57) ABSTRACT

Methods and systems are provided for operating a driveline of a hybrid vehicle that includes an internal combustion engine, an electric machine, and a transmission are described. In one example, torque output from the engine and the electric machine is adjusted to provide controlled vehicle side slip during cornering by a vehicle.

20 Claims, 9 Drawing Sheets

(52) U.S. Cl.
CPC ........ *Y02T 10/6286* (2013.01); *Y02T 10/7077* (2013.01); *Y02T 10/7275* (2013.01); *Y10S 903/93* (2013.01)

(56) References Cited

U.S. PATENT DOCUMENTS

| | | | |
|---|---|---|---|
| 6,959,971 B2 | 11/2005 | Tsunehara | |
| 7,774,103 B2 | 8/2010 | Deng et al. | |
| 9,297,455 B2 | 3/2016 | Li | |
| 9,637,001 B2* | 5/2017 | Gao | B60K 28/16 |
| 9,771,084 B2* | 9/2017 | Norstad | B62D 5/0406 |
| 9,802,621 B2* | 10/2017 | Gillingham | B62D 5/0406 |
| 2002/0163250 A1 | 11/2002 | Huls et al. | |
| 2004/0069082 A1* | 4/2004 | Koenig | F16H 61/2807 74/335 |
| 2006/0074530 A1* | 4/2006 | Meyers | B60G 17/016 701/1 |
| 2010/0032223 A1* | 2/2010 | Kermani | A63G 25/00 180/216 |
| 2014/0144259 A1* | 5/2014 | Downs | B60K 23/08 74/55 |
| 2014/0297120 A1* | 10/2014 | Cotgrove | B60T 8/17552 701/41 |
| 2015/0298702 A1* | 10/2015 | Reinisch | B62D 15/025 701/41 |
| 2016/0046186 A1* | 2/2016 | Gao | B60K 28/16 701/90 |
| 2016/0046287 A1* | 2/2016 | Owen | B60W 50/082 701/43 |
| 2016/0121924 A1* | 5/2016 | Norstad | B62D 5/0406 701/42 |
| 2016/0272209 A1* | 9/2016 | Kato | B60W 30/02 |
| 2018/0009443 A1* | 1/2018 | Norstad | B62D 5/0406 |
| 2018/0106201 A1* | 4/2018 | Yuan | F02D 41/0087 |
| 2018/0141543 A1* | 5/2018 | Krosschell | B60W 10/06 |
| 2018/0257631 A1* | 9/2018 | Fodor | B60W 20/30 |

OTHER PUBLICATIONS

Zhao, Yanan, et al., "Methods and System for a Hybrid Vehicle," U.S. Appl. No. 15/457,771, filed Mar. 13, 2017, 75 pages.

Ortmann, Walter Joseph, et al., "Methods and System for Operating a Hybrid Vehicle," U.S. Appl. No. 15/457,860, filed Mar. 13, 2017, 55 pages.

* cited by examiner

METHODS AND SYSTEM PROVIDING VEHICLE DRIFT

FIELD

The present description relates generally to methods and systems for controlling a driveline of a hybrid vehicle. The methods and systems may be particularly useful for hybrid vehicles that include a dual clutch transmission.

BACKGROUND/SUMMARY

A driver of a vehicle may want to operate a vehicle with side slip to compete in vehicle drifting completion or to show a high level of vehicle control. A vehicle may drift around a turn when a driver over steers and the vehicle's rear wheels slip such that the vehicle moves around a turn with its front wheels pointing in a direction away from the turn while the vehicle travels in the direction of the turn. A vehicle driver may find it difficult to induce and maintain side slip while controlling the vehicle's travel to a desired trajectory. Specifically, a vehicle driver may simultaneously manipulate a position of an accelerator pedal and a position of a steering wheel angle to induce vehicle side slip and control the vehicle's trajectory around a turn; however, the vehicle driver may find it difficult to maintain a proper balance of tire lateral forces at high vehicle sideslip angle. In addition, increased driver skill may be needed when response of the vehicle's driveline and driven axle wheel slip to changes in accelerator pedal position is slow. Further, the vehicle driver may observe little or no feedback of driven axle slip level feedback or a clear connection between steering wheel angle, vehicle sideslip angle, and driven wheel slip. Consequently, a vehicle driver that is less familiar with a particular vehicle or a vehicle driver that is unaccustomed to operating a vehicle with side slip, may find it difficult to induce vehicle side slip and direct a vehicle around a turn. Therefore, it may be desirable provide a vehicle system that assists a vehicle driver to initiate and control a vehicle side slip angle for drift cornering.

The inventors herein have recognized the above-mentioned issues and have developed a driveline operating method, comprising: receiving a steering angle and an accelerator pedal position to a controller; and adjusting output of driveline torque source to induce vehicle side slip via the controller in response to the steering angle being greater than a threshold angle and the accelerator pedal position being greater than a threshold position By adjusting output of a driveline torque source in response to steering angle and accelerator pedal position, it may be possible to provide controlled vehicle side slip so that a vehicle may drift around corners of a closed track. In one example, output of an internal combustion engine and output of a rear drive unit electric machine may be increased as input from a human driver or automated driver increases steering angle input and accelerator pedal input. Further, rear drive unit electric machine output and internal combustion engine output may be limited or constrained so as to limit a vehicle side slip angle. In this way, vehicle side slip may be controlled so that vehicle side slip may be induced without providing a vehicle side slip angle that is greater than a threshold.

The present description may provide several advantages. For example, the approach may improve a vehicle driver's ability to induce and control a vehicle side slip angle. In addition, the approach may further improve a vehicle's capacity to enter a side slip condition via inducing transmission shift shock. Further, the approach may improve a vehicle's ability to enter a side slip condition and remain in the side slip condition via coordinated engine and electric machine torque.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for operating a driveline of a hybrid vehicle. FIGS. 1A-3 show an example hybrid vehicle system that includes a driveline with a motor, an integrated starter/generator, a dual clutch transmission, and a rear drive unit with an electric machine that is positioned downstream of the dual clutch transmission. FIGS. 4-7 describe a controller and methods for initiating and controlling vehicle side slip. FIG. 8 provides a visual example of vehicle side slip angle and steering angle.

Figure 1A:
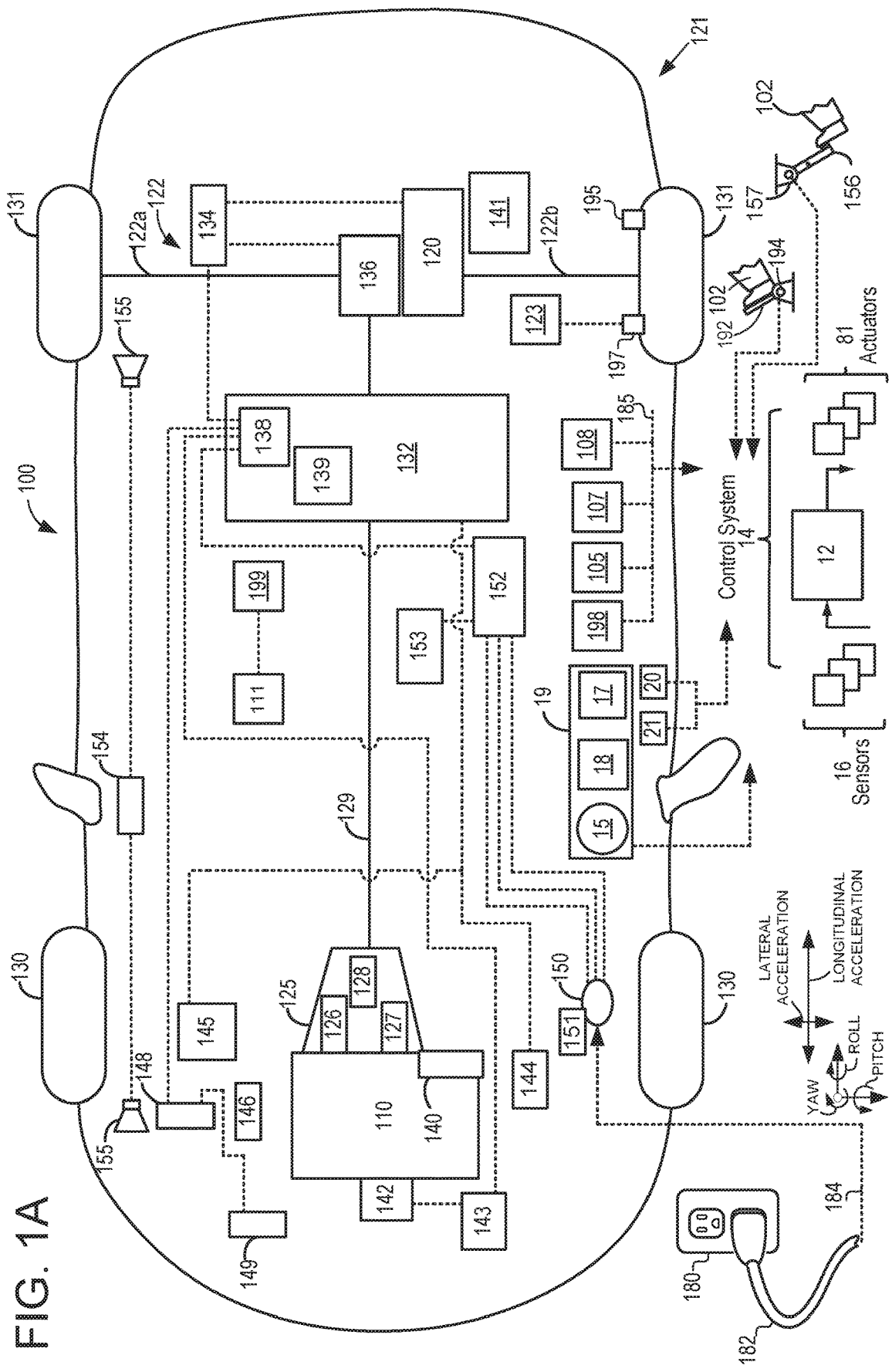
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122*b*. Vehicle propulsion system 100 further has front wheels 130 and rear wheels 131. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set and one or more clutches to decouple transmission 125 and electric machine 120 from wheels 131. Rear drive unit 136 may include electric machine 120 and axle 122.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 2, transmission 125 may shift gears by selectively opening and closing first clutch 126 and second clutch 127.

Electric machine 120 may receive electrical power from onboard energy storage device 132. Furthermore, electric machine 120 may provide a generator function to convert engine output or the vehicle's kinetic energy into electrical energy, where the electrical energy may be stored at energy storage device 132 for later use by the electric machine 120 or integrated starter/generator 142. A first inverter system controller (ISC1) 134 may convert alternating current generated by electric machine 120 to direct current for storage at the energy storage device 132 and vice versa.

In some examples, energy storage device 132 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system or anti-skid braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIG. 3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 130) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Figure 1B:
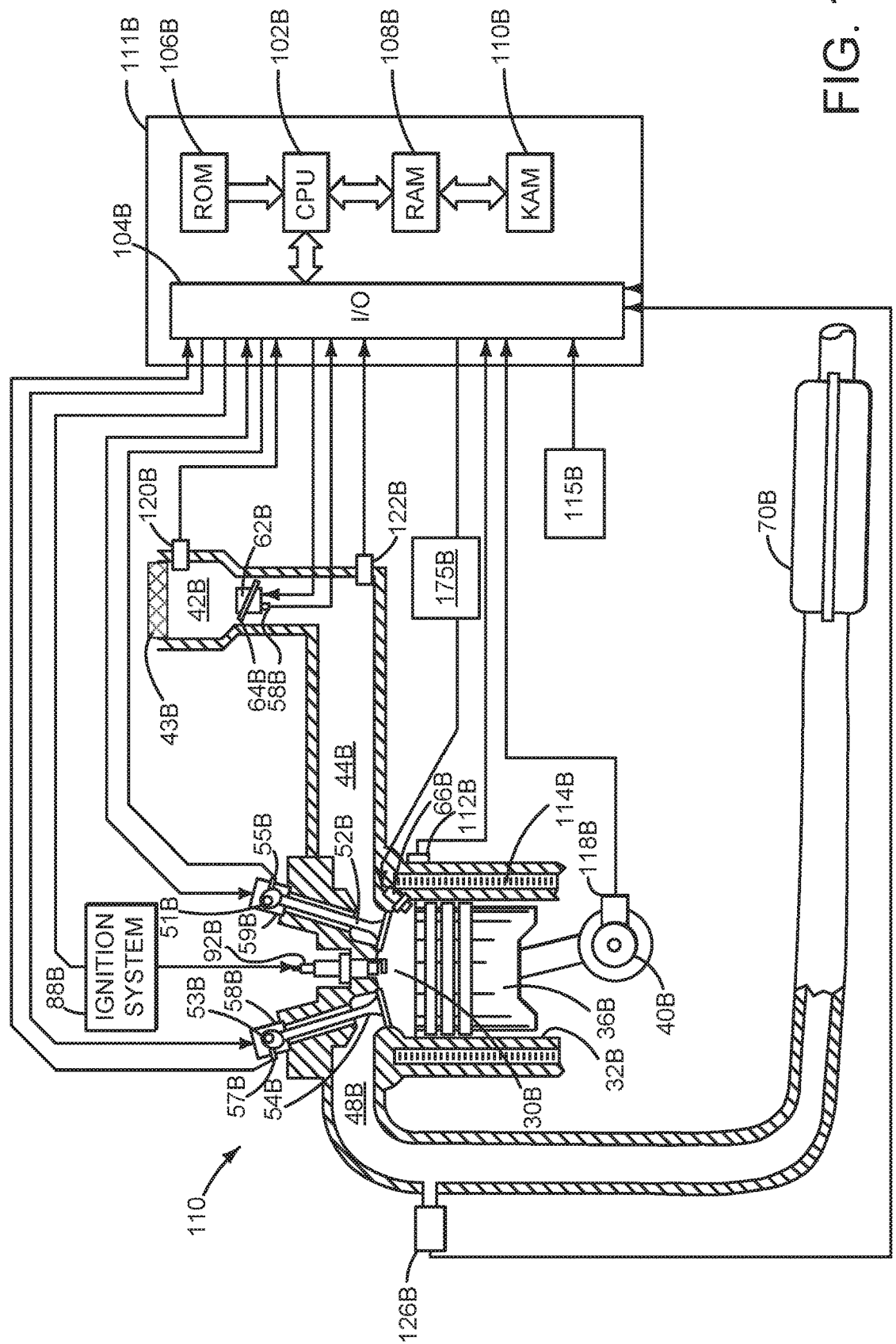
FIG. 1B is a sketch of an engine of the hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 2:
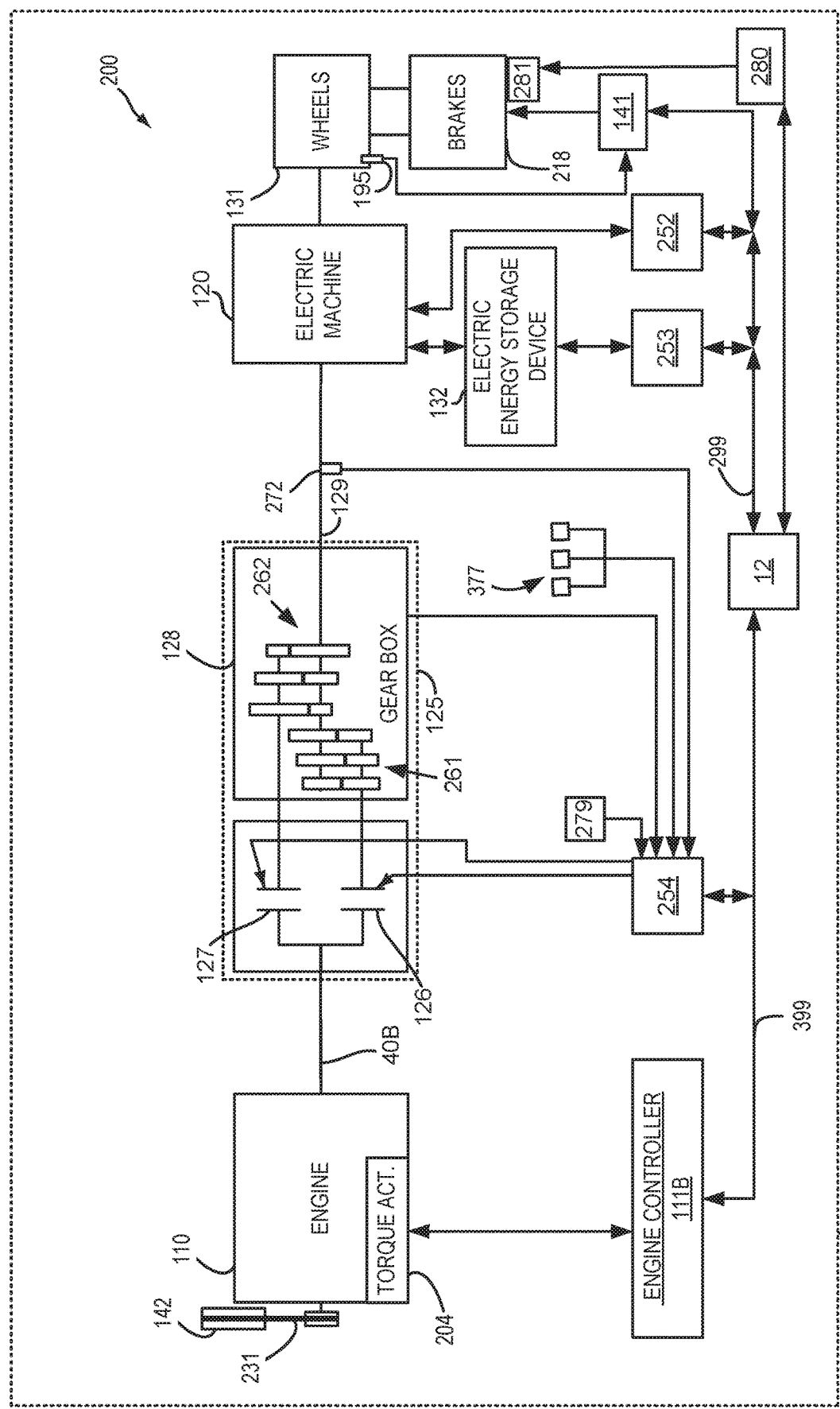
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIG. 1A-1B. Other components of FIG. 2 that are common with FIG. 1A are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), toque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream if transmission 125. Transmission 125 is positioned upstream of electric machine 120, and BISG 142 may be positioned upstream of engine 110, or downstream of engine 110 and upstream of transmission 125.

Figure 3:
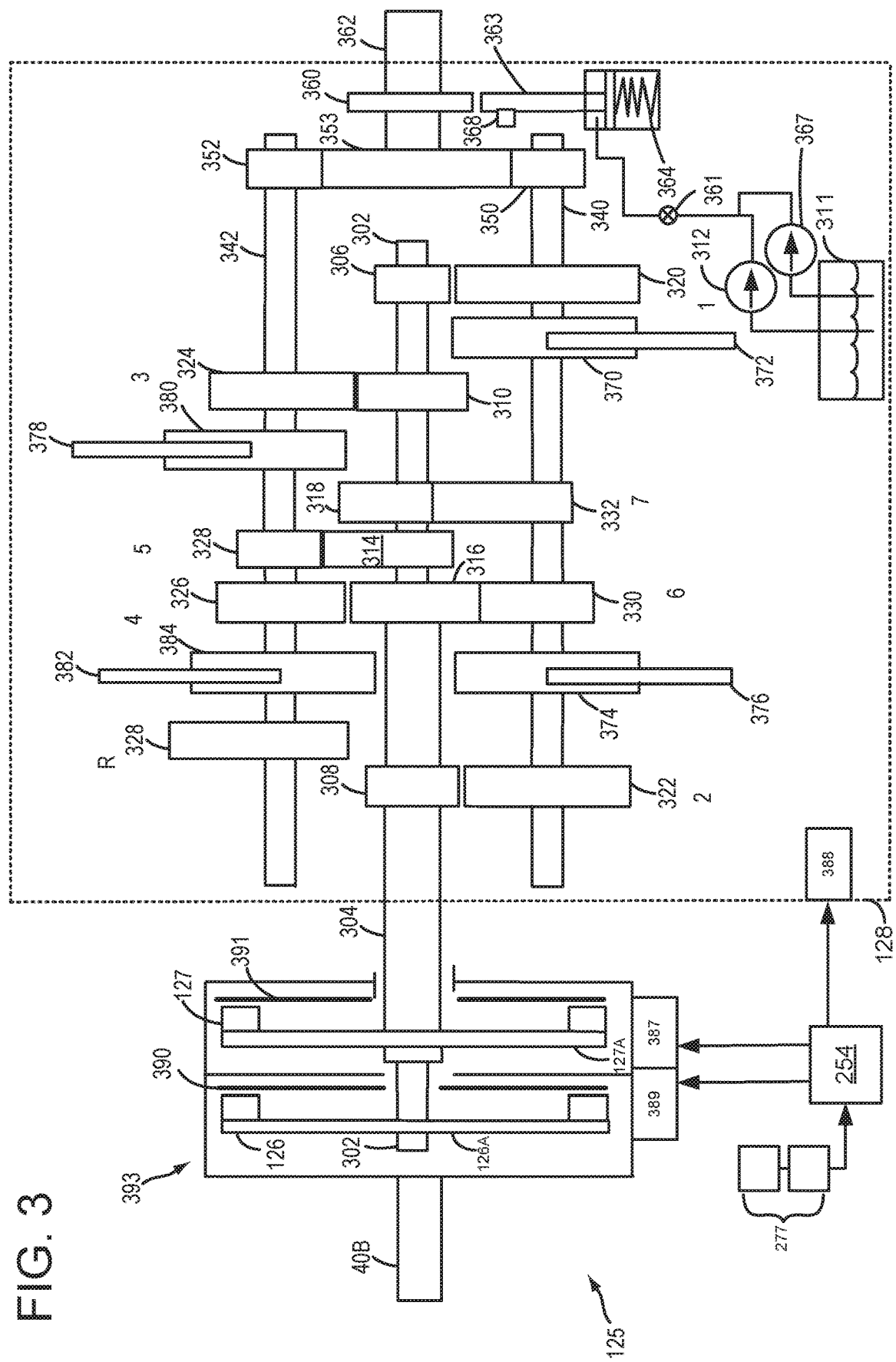
FIG. 3 is a schematic diagram of a dual clutch transmission located in the hybrid vehicle driveline.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 493 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 328, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 302 and second clutch 304 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 328, and reverse gear 328. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 328, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 382. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 340 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 328. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127.

As such TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor, which may be utilized by the TCM to detect position of selector forks (e.g. 372, 376, 378, 382).

DCT 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 340, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 300 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g.

drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Thus, the system of FIGS. 1A-3 provides for Thus, the system of FIGS. 1A-4 provides for a system, comprising: a vehicle including a steering wheel; an engine positioned within the vehicle; a dual clutch transmission coupled to the engine; a rear drive unit including a rear axle and an electric machine coupled to the dual clutch transmission via a driveshaft; and a controller including executable instructions stored in non-transitory memory to provide a desired vehicle side slip angle via adjusting a torque of the electric machine in response to a steering angle. The system further comprises additional instructions to determine a desired vehicle side slip angle from a position of the steering wheel, accelerator pedal position, and vehicle position on a closed track. The system further comprises additional instructions to adjust torque output of the engine in response to the desired vehicle side slip angle. The system further comprises additional instructions to determine a desired axle torque from the desired vehicle side slip angle. The system further comprises additional instructions to filter the desired axle torque via a first filter and a second filter. The system further comprises additional instructions to adjust an output torque of the engine in response to output of the first filter and not adjust the output torque of the engine in response to output of the second filter.

Figure 4:
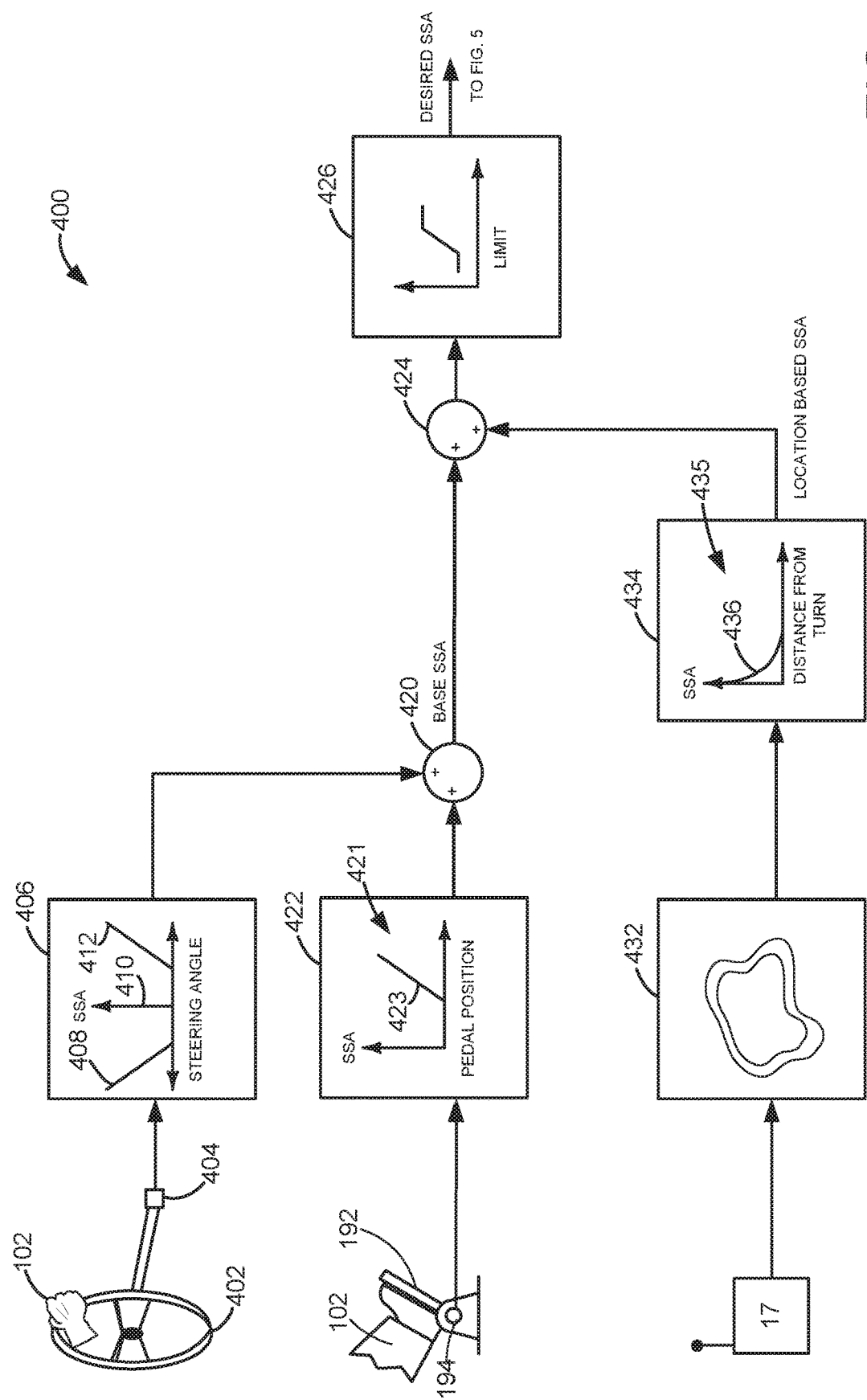
FIG. 4 is a block diagram of a portion of a controller that determines a desired vehicle side slip angle.

Turning to FIG. 4, a first portion of a controller for adjusting powertrain output to improve vehicle side slip control is shown. Controller 400 receives input from steering angle sensor 404, which indicates a steering angle. Steering angle sensor 404 is shown coupled to steering wheel 402, but in some examples it may be coupled to steering linkage (not shown). Steering wheel 402 may be rotated via human driver 102 or via an autonomous driver (not shown). Steering angle data is input to function 406 which outputs a steering angle derived vehicle side slip request. In one example, function 406 may provide a vehicle side slip request value of zero while steering wheel 402 is centered in its base position where it directs the vehicle in a straight path. Function 406 may begin to output a vehicle side slip angle that is non-zero only after steering wheel 402 is providing or requesting a steering angle with an absolute value greater that a threshold angle. Function 406 output may increase linearly or non-linearly and continuously with the steering angle after the steering angle absolute value is greater than the threshold angle (e.g., 30 degrees). Thus, function 406 may output a vehicle side slip angle as indicated by plot 410. The vertical axis corresponds to vehicle side slip angle (SSA) and the horizontal axis corresponds to steering angle, where the steering angle is zero at the vertical axis (e.g., the wheels are pointing the vehicle in a straight direction or path. The SSA is shown increasing as indicated at 408 when the steering angle is negative after the steering angle is greater than a threshold value. The SSA is also shown as increasing at 412 when the steering angle is positive after the steering angle is greater than a threshold value. Function 406 outputs a steering angle derived vehicle side slip request to summing junction 420. Values stored in function 406 may be empirically determined and stored to controller memory.

Controller 400 also receives input from accelerator pedal sensor 194, which indicates a position of accelerator pedal 192. Accelerator pedal 192 may be applied via human driver 102 or via an autonomous driver (not shown). Accelerator pedal position data is input to function 422 which outputs an accelerator pedal derived vehicle side slip request. In one example, function 422 may provide a vehicle side slip request value of zero while accelerator pedal position is less than a threshold. Function 422 may begin to output a vehicle side slip angle that is non-zero only after accelerator pedal 192 is applied greater than a threshold amount (e.g., requested greater than a threshold amount of driveline torque). Function 422 output may increase linearly or non-linearly and continuously with the accelerator pedal position is greater than the threshold. Thus, function 422 may output a vehicle side slip angle as indicated by plot 421. The vertical axis of plot 421 corresponds to vehicle side slip angle (SSA) and the horizontal axis corresponds to accelerator pedal position, where the accelerator pedal position is zero at the vertical axis (e.g., the accelerator pedal is not applied). The SSA is shown increasing as indicated at 423 when the accelerator pedal is greater than a threshold value. Function 422 outputs an accelerator pedal derived vehicle side slip request to summing junction 420. Values stored in function 422 may be empirically determined and stored to controller memory.

At 420, the accelerator pedal derived vehicle side slip request (e.g., an angle) is added to the steering wheel derived vehicle side slip request to provide a base vehicle side slip angle. The base vehicle side slip angle is input to summing junction 424.

Global positioning receiver 17 provides a position of vehicle 121 which is input to track map 432. The track map 432 may be a map of a closed track used for racing or vehicle demonstrations. A distance from the vehicle's present position to a next curve of the track in the vehicle's path is output of track map 432 and input to function 434. A vehicle position derived vehicle side slip angle request is output from function 434 in response to the distance to the next curve on the track in the path of the vehicle. If the vehicle is presently negotiating a curve, the distance to the curve is zero. The distance to the next curve is updated when the vehicle exits a curve. In one example, the output of function 434 may conform to plot 435. Specifically, the vehicle side slip angle request increases as indicated by curve 436 as the vehicle gets closer to the curve on the track. The vehicle side slip angle decreases the further the vehicle is away from a curve in the vehicle's forward path around the track. The vehicle position derived vehicle side slip angle request is routed to summing junction 424.

At summing junction 424, the base vehicle side slip angle is added to the vehicle position derived vehicle side slip angle and the result is input to limiting function 426. The output of summing junction 424 is limited to or constrained to a threshold value. For example, if limiter 426 constrains vehicle side slip angle to less than +60 degrees, output of function 426 is 45 if output of summing junction 424 is 45. However, if output of summing junction 424 is 75, output from limiter 426 is 60 degrees. The output of limiting function 426 is a desired vehicle side slip angle.

Thus, steering angle, accelerator pedal position, and vehicle location may be the basis for determining a desired or allowable vehicle side slip angle. As such, urging a vehicle to a vehicle side slip angle may be facilitated if the vehicle is at a designated area of a closed track, but less assistance may be provided to urge the vehicle to a side slip angle if the vehicle is not within an area of a track designated for greater vehicle side slip angles.

Figure 5:
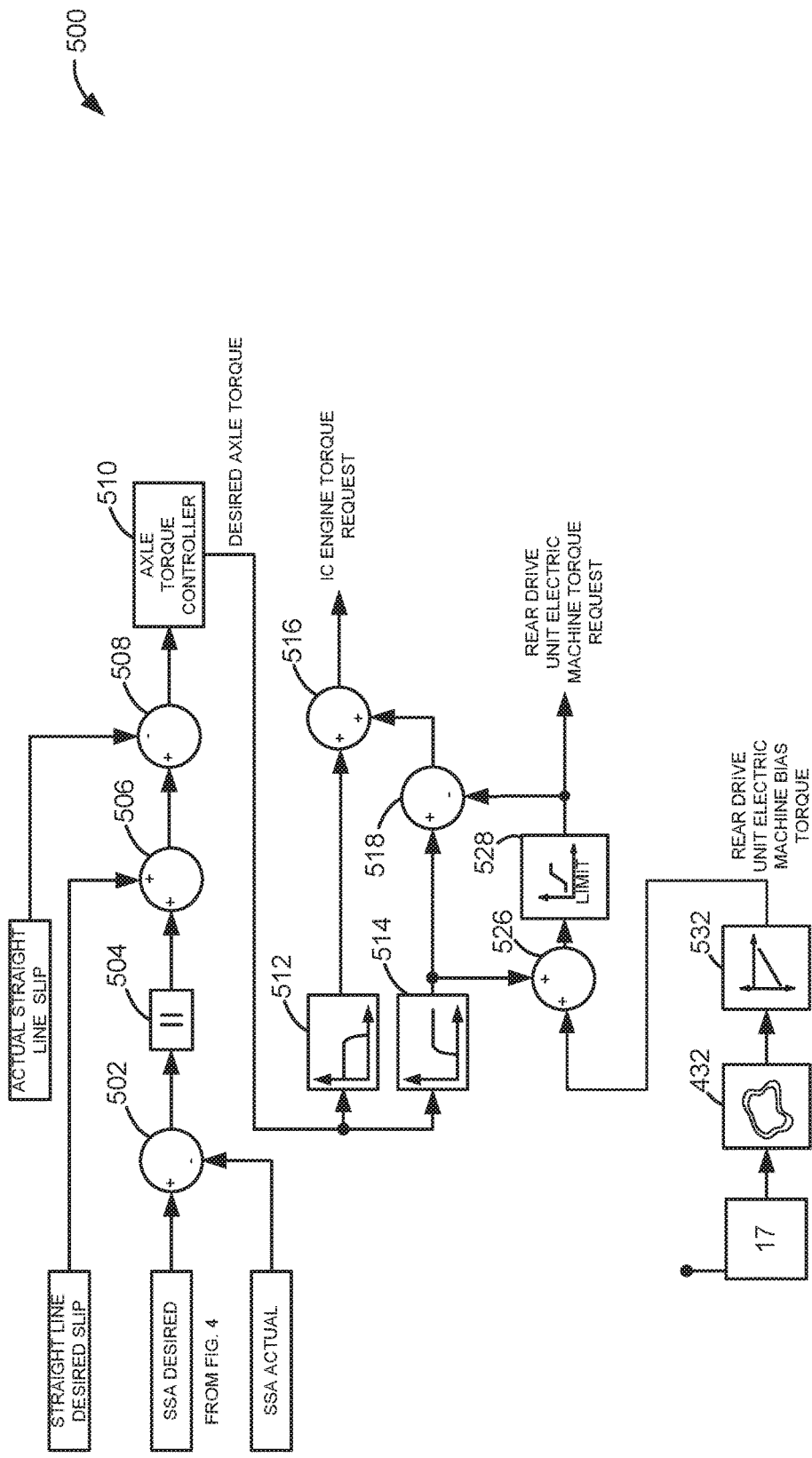
FIG. 5 is a block diagram of a portion of a controller that adjusts output of driveline torque sources to control vehicle side slip angle.

Referring now to FIG. 5, a second portion of a controller for adjusting powertrain output to improve vehicle side slip control is shown. Controller 500 receives a desired vehicle side slip angle from output of function 426 shown in FIG. 4, and the desired vehicle slip angle in input to summing junction 502. A measured or actual vehicle side slip angle is also provided to summing junction 502. The measured or actual vehicle side slip angle may be determined via vehicle accelerometers, the vehicle GPS system, or via other known sources that may determine vehicle side slip angle. The actual or measured vehicle side slip angle is subtracted from the desired vehicle side slip angle and the result is input from summing junction 502 into function 504 where an absolute value of the output of summing junction 502 is performed as well as a gain to convert side slip error to wheel slip. Function 504 outputs the absolute value of the output of summing junction 502 to summing junction 506. A desired straight line desired wheel slip is added to the output of function 504 at summing junction 506. The desired straight line desired wheel slip may be determined from estimated road surface friction level and vehicle speed. Actual straight line wheel slip is subtracted from the output of summing junction 506 at summing junction 508. In one example, the actual straight line wheel slip may be determined via subtracting speed of a non-driven wheel (e.g., front vehicle wheel) from a speed of a driven wheel (e.g., rear vehicle wheel). The output of summing junction 508 is input to rear axle torque controller 510.

In one example, rear axle torque controller 510 is a proportional/integral (PI) torque controller. However, other known controllers may be substituted for the PI controller to provide the rear axle torque controller. Output from rear axle torque controller 510 is a torque request and it is input to low pass filter 512 and high pass filter 514. Low pass filter 512 is in a parallel configuration with high pass filter 514 such that high pass filter 514 and low pass filter 512 filter same torque values output from axle controller 510. Output from low pass filter 512 is directed to summing junction 516 and output from high pass filter 514 is directed to summing junction 518. Low pass filter 512 passes axle torque request frequencies below a first threshold frequency and high pass filter 514 passes axle torque request frequencies above a second threshold frequency.

Global positioning receiver 17 provides a position of vehicle 121 which is input to track map 432. The track map 432 may be a map of a closed track used for racing or vehicle demonstrations. A distance from the vehicle's present position to a next curve of the track in the vehicle's path is output of track map 432 and input to function 532. A vehicle position derived rear drive unit electric machine bias torque is output from function 532 in response to the distance to the next curve on the track in the path of the vehicle. If the vehicle is presently negotiating a curve, the distance to the curve is zero. The distance to the next curve is updated when the vehicle exits a curve. In one example, the rear drive unit electric machine torque bias is increasingly negative as the vehicle approaches the turn. Function 532 provides a rear drive unit electric machine bias torque to summing junction 526 where it is added to the output of high pass filter 514.

The output of summing junction 526 is input to limiting function 528. The output of summing junction 528 is limited to or constrained to a threshold value. For example, if limiter 528 constrains rear drive unit electrical machine torque to 300 Nm, output of function 528 is 200 if output of summing junction 526 is 200. However, if output of summing junction 526 is 400, output from limiter 528 is 300 Nm. The output of limiting function 528 is a desired or commanded rear drive unit electric machine torque request.

The rear drive unit electric machine torque is subtracted from the output of high pass filter 514 and summing junction 518. The output of summing junction 518 is added to the output of low pass filter 512 and summing junction 516 to provide an internal combustion (IC) engine torque request or command.

Thus, controller 400 receives steering angle, accelerator pedal position, and vehicle position as inputs and provides a rear drive unit electrical machine torque request and an engine torque request from the inputs. The electric machine torque request and the engine torque request may facilitate providing a desired vehicle side slip angle and controlling the vehicle to operate near the desired vehicle side slip angle.

Figure 6:
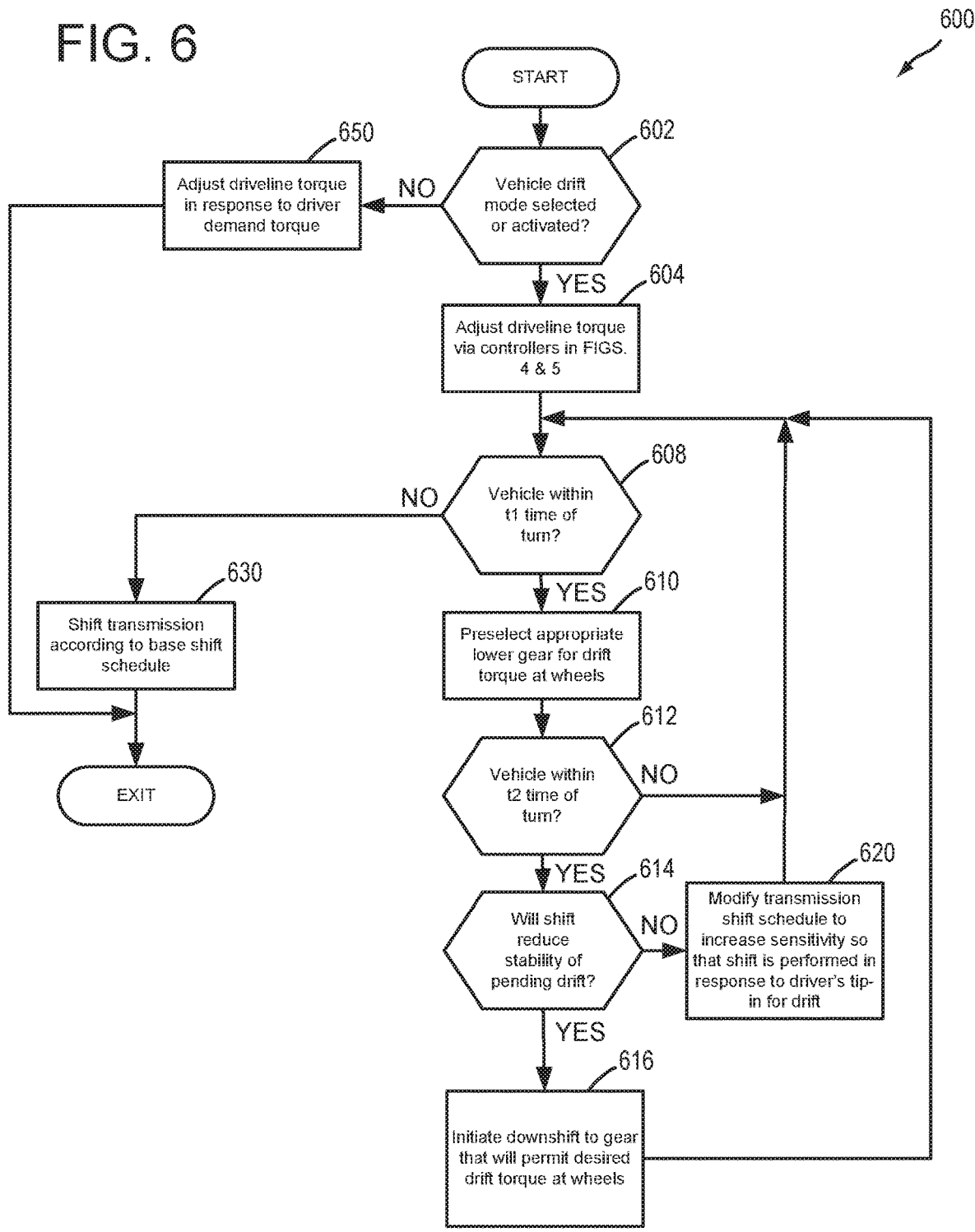
FIG. 6 is a flowchart of a method to control vehicle side slip.

Referring now to FIG. 6, a flowchart of a method for controlling vehicle side slip is shown. The method of FIG. 6 may be incorporated into and may cooperate with the system of FIGS. 1A-4. Further, at least portions of the method of FIG. 6 may be incorporated as executable instructions stored in non-transitory memory while other portions of the method may be performed via a controller transforming operating states of devices and actuators in the physical world.

At 602, method 600 judges if a vehicle drift mode is selected. A vehicle drift mode may be selected and the vehicle may enter into drift mode to operate the vehicle at a controlled side slip angle greater than zero. The vehicle drift mode may be selected by a human driver or an autonomous driver. Method 600 may judge that drift mode is selected and the vehicle is in drift mode based on a position of a switch or a state of a variable stored in controller memory. If method 600 judges that the vehicle is in drift mode, the answer is yes and method 600 proceeds to 604. Otherwise, the answer is no and method 600 proceeds to 650.

At 650, method 600 adjusts driveline torque in response to human driver or autonomous driver demand torque. The demand torque may be an axle demand torque, and the axle demand torque may be partitioned into an internal combustion engine torque and a rear drive unit electric machine torque. For example, if the driver demand torque is 200 N-m at the axle, the control system may provide 150 Nm to the axle via the internal combustion engine and the transmission and 50 Nm via the rear drive unit. Method 600 provides the requested demand torque solely via the internal combustion engine, via the engine and the rear drive unit electric machine, or solely via the rear drive unit electric machine. Method 600 proceeds to exit.

At 604, method 600 adjusts driveline torque via the controller as described in FIGS. 4 and 5. In particular, internal combustion engine torque and rear drive unit electric machine torque are adjusted to facilitate the vehicle operating at a desired side slip angle. The torque output of the engine and the electric machine are adjusted in response to steering angle, accelerator pedal position, and vehicle location on a track. Method 600 proceeds to 608.

At 608, method 600 judges if the vehicle is within a predetermined time t1 of entering a corner where the vehicle may operate at a desired side slip angle. In one example, the predetermined time may be empirically determined and stored in controller memory. For example, it may be determined that it takes 600 milliseconds to preselect a gear of the vehicle's transmission. A gear may be preselected via moving shift forks of the transmission to move a gear on a half shaft without engaging the gear and transferring engine torque through the gear being preselected. Thus, time t1 may be a value of 600 milliseconds which corresponds to a gear preselect time. Of course, time t1 may be adjusted to other values for other reasons. Method 600 may judge if the vehicle is within a predetermined time of entering a corner by dividing a distance of the vehicle to the corner by the speed of the vehicle. If the vehicle is within time t1 (e.g., less than 600 milliseconds) of entering a next corner in the vehicle forward path, the answer is yes and method 600 proceeds to 610. Otherwise, the answer is no and method 600 proceeds to 630. If the vehicle is presently negotiating a corner, method 600 may maintain the transmissions presently engaged gear.

At 630, method 600 shifts the transmission according to a base transmission shift schedule. The based transmission shift schedule may shift the transmission gears in response to vehicle speed and requested axle torque or wheel torque. The upshift (e.g., from $1^{st}$ gear to $2^{nd}$ gear) points or conditions and the downshift points or conditions (e.g., vehicle speed and demanded axle or wheel torque) may be empirically determined and stored in controller memory. Method 600 proceeds to exit.

At 610, method 600 preselects a gear for operating the vehicle at the desired side slip angle. A transmission gear may be preselected via moving shift forks of the transmission to move a gear on a half shaft without engaging the gear and transferring engine torque through the gear being preselected. The gear that is preselected may be a function of the vehicles present speed at time t1, the amount of driveline power that is available to the axle and wheels, and the corner being negotiated. For example, if the vehicle enters a sharp or tight corner at 35 Km per hour with 400 Nm of available driveline torque from the engine and the rear drive unit electric machine, the vehicle may downshift to second gear to negotiate the turn. In one example, a shift schedule indexed by available driveline torque, corner specifications (e.g., radius), and present vehicle speed outputs a preselect gear and the preselect gear is moved to lock the preselect gear to its corresponding layshaft. Method 600 proceeds to 612 after preselecting a gear for operating the vehicle at a non-zero side slip angle.

At 612, method 600 judges if the vehicle is within a predetermined time t2 of entering a corner where the vehicle may operate at a desired side slip angle. The predetermined time t2 may be a smaller amount of time than t1. In one example, the predetermined time may be empirically determined and stored in controller memory. For example, it may be determined that it takes 400 milliseconds to shift into the preselected gear of the vehicle's transmission. Thus, time t2 may be a value of 400 milliseconds which corresponds to a gear shift time so that the desired gear may be timely engaged. Of course, time t2 may be adjusted to other values for other reasons. Method 600 may judge if the vehicle is within a predetermined time of entering a corner by dividing a distance of the vehicle to the corner by the speed of the vehicle. If the vehicle is within time t2 of entering a next corner in the vehicle forward path, the answer is yes and method 600 proceeds to 614. Otherwise, the answer is no and method 600 returns to 608. If the vehicle is presently negotiating a corner, method 600 may maintain the transmissions presently engaged gear.

At 614, method 600 judges if a shift to engage a gear for negotiating the curve will reduce stability of the upcoming drift or vehicle side slip maneuver by inducing too much shift shock during mid-drift wheel slip control. The transmission is shifted into and engages the preselected gear if the answer is yes and the shift would potentially destabilize the vehicle while in drift mode. In one example, method 600 may judge that the shift would destabilize the vehicle via shift shock. This establishes engagement of the desired gear so that the driver does not have to wait for a downshift to finish before the driven wheels can begin slipping and so that the driver may not be disturbed by the shift if a drift maneuver has begun. If the shift would not disturb/delay the drift event (e.g., operating the vehicle at a side slip angle that is non-zero), the answer is no and method 600 proceeds to 620.

At 616, method 600 initiates a downshift to the preselected gear so as to improve the possibility of maintaining the desired vehicle side slip angle. The downshift may allow additional torque to be delivered to the vehicle's wheels so that the vehicle operates at the desired side slip angle. Method 600 returns to 608 after the transmission is downshifted.

At 620, method 600 increase a sensitivity to accelerator pedal application or rotation so that the transmission gear shift will be initiated by the driver's increasing foot movement so that the shift takes place at the beginning of a pedal-induced drift event. In other words, if the shift is not judged to reduce stability of drift (e.g., operating the vehicle at the desired non-zero side slip angle), the amount of accelerator pedal movement that initiates the downshift may be reduced so that the downshift may commence with only a small amount of accelerator pedal movement. Thus, method 600 may adjust the shift schedule to promote a downshift at a lower accelerator pedal position. Method 600 returns to 608.

In this way, entry into a controlled vehicle side slip condition may be facilitated by outputting engine and rear drive unit torque that are derived from a desired vehicle side slip angle. Further, a gear that may improve the vehicle's capability to operate at the desired side slip angle is selected so that wheel slip may be induced and controlled.

Figure 7:
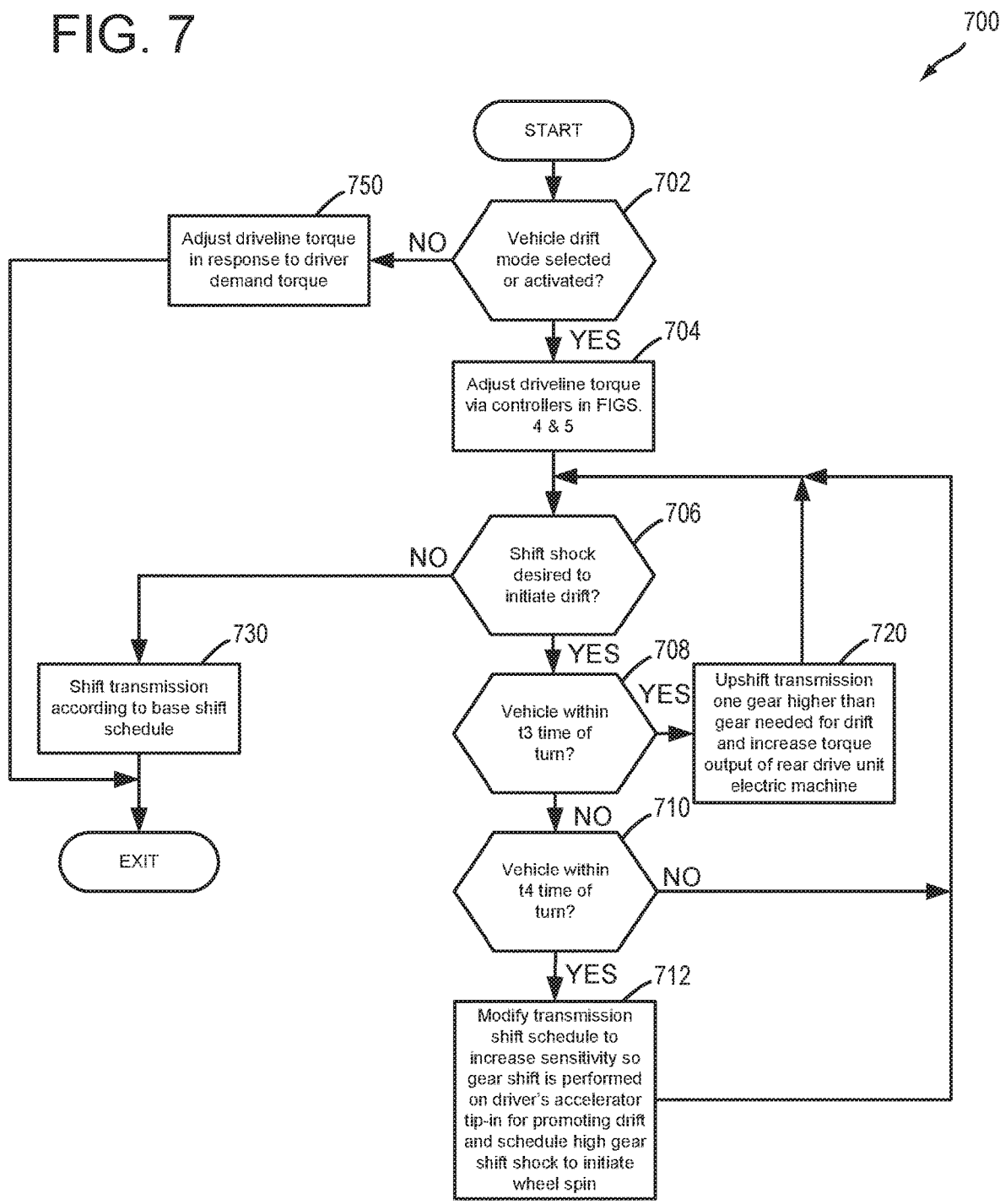
FIG. 7 is a flowchart of an alternative method for controlling vehicle side slip.
Figure 8:
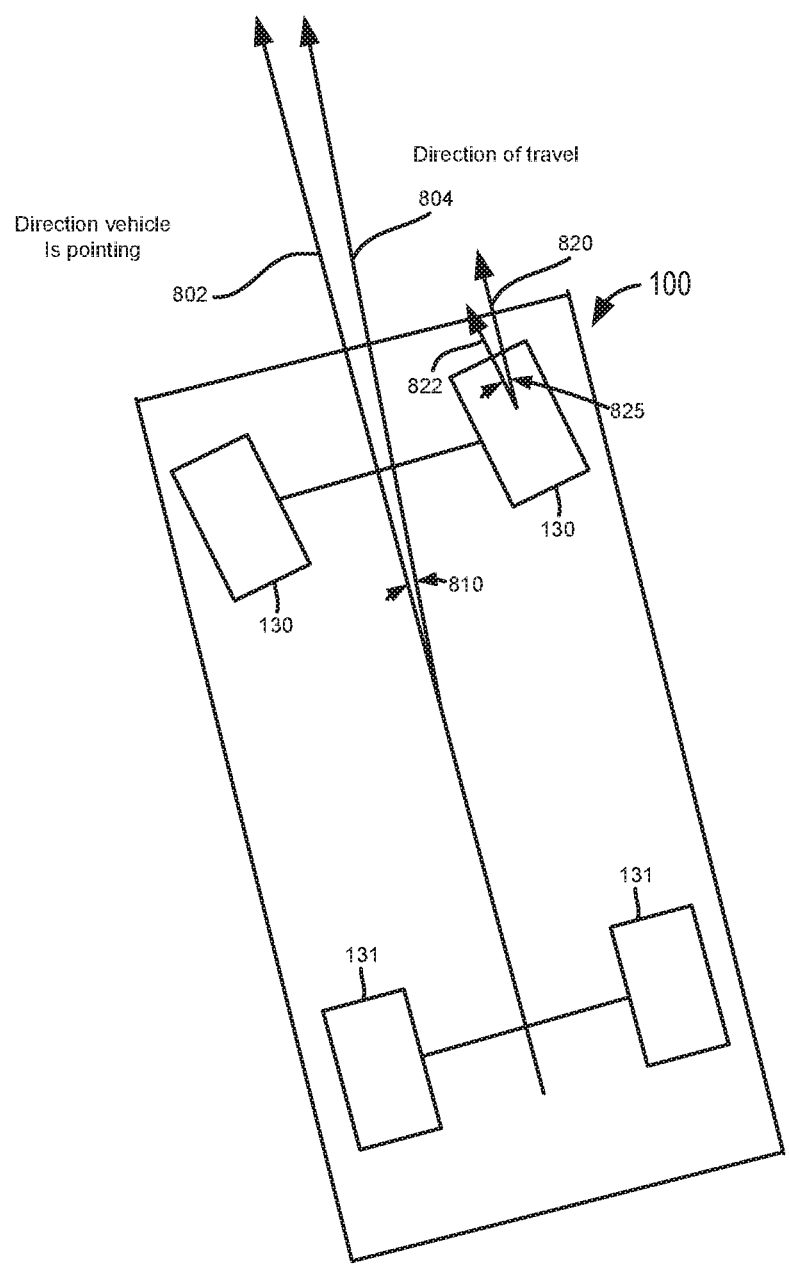
FIG. 8 is a sketch that shows a vehicle side slip angle and steering angle.

Referring now to FIG. 7, a flowchart of a method for controlling vehicle side slip is shown. The method of FIG. 7 may be incorporated into and may cooperate with the system of FIGS. 1A-4. Further, at least portions of the method of FIG. 7 may be incorporated as executable instructions stored in non-transitory memory while other portions of the method may be performed via a controller transforming operating states of devices and actuators in the physical world.

At 702, method 700 judges if a vehicle drift mode is selected. A vehicle drift mode may be selected and the vehicle may enter into drift mode to operate the vehicle at a controlled side slip angle greater than zero. The vehicle drift mode may be selected by a human driver or an autonomous driver. Method 700 may judge that drift mode is selected and the vehicle is in drift mode based on a position of a switch or a state of a variable stored in controller memory. If method 700 judges that the vehicle is in drift mode, the answer is yes and method 700 proceeds to 704. Otherwise, the answer is no and method 700 proceeds to 750.

At 750, method 700 adjusts driveline torque in response to human driver or autonomous driver demand torque. The demand torque may be an axle demand torque, and the axle demand torque may be partitioned into an internal combustion engine torque and a rear drive unit electric machine torque. Method 700 provides the requested demand torque solely via the internal combustion engine, via the engine and the rear drive unit electric machine, or solely via the rear drive unit electric machine. Method 700 proceeds to exit.

At 704, method 700 adjusts driveline torque via the controller as described in FIGS. 4 and 5. In particular, internal combustion engine torque and rear drive unit electric machine torque are adjusted to facilitate the vehicle operating at a desired side slip angle. The torque output of the engine and the electric machine are adjusted in response to steering angle, accelerator pedal position, and vehicle location on a track. Method 700 proceeds to 706.

At 706, method 700 judges if shift shock is desired to initiate drift. Shift shock is a rapid rate of change in torque delivered from an input shaft of a transmission to an output shaft of the transmission. Shift shock may be increased via reducing an amount of time to close a transmission clutch. Shift shock may be reduced via slipping the clutch for a longer time period during the gear shift to smooth the torque transfer from the transmission input shaft to the transmission output shaft. In one example, shift shock may be desired if the powertrain or driveline torque capacity provides only a small amount of wheel slip. By increasing shift shock, the wheels may break free from the road surface thereby reducing the frictional between the tire and the road surface so that the desired vehicle slip angle may be achieved. If method 700 judges that shift shock is desired, the answer is yes and method 700 proceeds to 708. Otherwise, the answer is no and method 700 proceeds to 730.

At 730, method 700 shifts the transmission according to a base transmission shift schedule. The based transmission shift schedule may shift the transmission gears in response to vehicle speed and requested axle torque or wheel torque. The upshift (e.g., from $1^{st}$ gear to $2^{nd}$ gear) points or conditions and the downshift points or conditions (e.g., vehicle speed and demanded axle or wheel torque) may be empirically determined and stored in controller memory. Method 700 proceeds to exit.

At 708, method 700 judges if the vehicle is within a predetermined time t3 of entering a corner where the vehicle may operate at a desired side slip angle. In one example, the predetermined time may be empirically determined and stored in controller memory. For example, it may be determined that it takes 600 milliseconds to preselect a gear of the vehicle's transmission. A gear may be preselected via moving shift forks of the transmission to move a gear on a half shaft without engaging the gear and transferring engine torque through the gear being preselected. Thus, time t3 may be a value of 600 milliseconds which corresponds to a gear preselect time. Of course, time t3 may be adjusted to other values for other reasons. Method 700 may judge if the vehicle is within a predetermined time of entering a corner by dividing a distance of the vehicle to the corner by the speed of the vehicle. If the vehicle is within time t3 (e.g., less than 600 milliseconds) of entering a next corner in the vehicle forward path, the answer is yes and method 700 proceeds to 720. Otherwise, the answer is no and method 700 proceeds to 710. If the vehicle is presently negotiating a corner, method 700 may maintain the transmissions presently engaged gear.

At 720, method 700 upshifts the transmission to a next higher gear than a desired gear for operating the vehicle at a desired side slip angle. Further, the engine and/or rear drive unit torque are increased to maintain a desired torque at the vehicles wheels and maintain vehicle speed at the present speed after the upshift. The transmission is upshifted so that when the vehicle is within time t4 of the next or upcoming corner, the vehicle can be downshifted to produce shift shock that induces wheel slip and the vehicle operating at the desired side slip angle. Additionally, the gear shifted into at time t4 may be preselected. Method 700 returns to 706.

At 710, method 600 judges if the vehicle is within a predetermined time t4 of entering a corner where the vehicle may operate at a desired side slip angle. The predetermined time t4 may be a smaller amount of time than t3. In one example, the predetermined time may be empirically determined and stored in controller memory. For example, it may be determined that it takes 400 milliseconds to shift into the preselected gear of the vehicle's transmission. Thus, time t4 may be a value of 400 milliseconds which corresponds to a gear shift time so that the desired gear may be timely engaged. Of course, time t4 may be adjusted to other values for other reasons. Method 700 may judge if the vehicle is within a predetermined time of entering a corner by dividing a distance of the vehicle to the corner by the speed of the vehicle. If the vehicle is within time t4 of entering a next corner in the vehicle forward path, the answer is yes and method 700 proceeds to 712. Otherwise, the answer is no and method 700 returns to 706. If the vehicle is presently negotiating a corner, method 700 may maintain the transmissions presently engaged gear.

At 712, method 700 initiates a downshift to the preselected gear so as to induce shift shock and improve the possibility of operating the vehicle at the desired vehicle side slip angle. To promote shift shock, a clutch closing time may be reduced when shift shock is requested as compared to a clutch closing time for shifting into the same gear being engaged when not operating in drift mode. For example, when shift shock is requested, the clutch may be closed in 400 milliseconds when downshifting from third gear to second gear. When shift shock is not requested, the clutch closing time may be 600 milliseconds when downshifting from third gear to second gear. The downshift may also allow additional torque to be delivered to the vehicle's wheels so that the vehicle operates at the desired side slip angle.

In addition, method 700 may also increase a sensitivity to accelerator pedal application or rotation so that the transmission gear shift will be initiated by the driver's increasing foot movement so that the downshift takes place at the beginning of a pedal-induced drift event. Thus, method 700 may adjust the shift schedule to promote a downshift at a lower accelerator pedal position. Method 700 returns to 706.

In this way, entry into a controlled vehicle side slip condition may be facilitated by inducing shift shock via reducing an amount of time to close a transmission clutch. Further, the shift shock may be provided in unison with adjusting engine and rear drive unit electric machine torque to improve operation at a desired vehicle side slip angle.

Thus, the methods of FIGS. 6 and 7 provide for a driveline operating method, comprising: receiving a steering angle and an accelerator pedal position to a controller; and adjusting output of driveline torque source to induce vehicle side slip via the controller in response to the steering angle being greater than a threshold angle and the accelerator pedal position being greater than a threshold position. The method includes where the driveline torque source is a rear drive unit electric machine, the rear drive unit electric machine coupled to a vehicle rear axle. The method includes where the driveline torque source is an internal combustion engine, and further comprising: not adjusting output of the driveline torque source to induce vehicle side slip via the controller in response to the steering angle being less than the threshold angle. The method further comprises adjusting output of the driveline torque source via the controller in response to a position of a vehicle on a track.

In some examples, the method further comprises determining a desired vehicle slip angle from the steering angle and the accelerator pedal position and determining a desired axle torque via the controller in response to the slip angle and the steering angle. The method further comprise filtering the desired axle torque via a low pass filter and a high pass filter and not adjusting output of the driveline torque source to induce vehicle side slip via the controller in response to the accelerator pedal position being less than the threshold position. The method further comprises adjusting torque of an internal combustion engine in response to a sum of output of the low pass filter and at least a portion of output of the high pass filter.

The methods of FIGS. 6 and 7 also provide for a driveline operating method, comprising: receiving a steering angle and an accelerator pedal position to a controller; and increasing a desired vehicle side slip angle via the controller in response to the steering angle being greater than a threshold angle during a vehicle drift mode, otherwise not increasing the desired vehicle side slip angle in response to the steering angle; increasing the desired vehicle side slip angle in response to the accelerator pedal position being greater than a threshold position during the vehicle drift mode, otherwise not increasing the desired vehicle side slip angle in response to the accelerator pedal position; adjusting output of a driveline torque source during the vehicle drift mode in response to the desired vehicle side slip angle; and shifting a transmission in response to a shift schedule, the shift schedule adjusted to shift the transmission at a lower accelerator pedal position than if the vehicle is not in the vehicle drift mode.

The method further comprises preselecting a transmission gear in response to a vehicle being in a drift mode and a position of the vehicle on a driving track. The method further comprises increasing a transmission shift shock in response to the vehicle being in a drift mode. The method includes where the shift shock is increased via decreasing an amount of time for a clutch to close. The method includes where the driveline torque source is a read drive unit electric machine. The method includes where the driveline torque source is an internal combustion engine. The method includes where the vehicle side slip angle is an angle between the vehicle's actual direction of travel and a direction the vehicle is pointing.

Referring now to FIG. 8, a sketch showing a vehicle side slip angle and steering angle is shown. Vehicle 100 includes front wheels 130 and rear wheels 131. Front wheels 130 are pointed left to so that the vehicle can negotiate a left turn. Arrow 820 indicates a direction of front wheels 130 when the vehicle is directed in a straight line. Arrow 822 indicates the way the wheels are presently pointing to negotiate the left turn. The angle 825 between arrow 820 and arrow 822 is the steering angle.

Arrow 802 indicates a direction the vehicle goes if the vehicle is traveling straight. Arrow 804 indicates the direction the vehicle is presently traveling with the wheels turned to the left. The angle between arrow 802 and arrow 804 is the vehicle side slip angle. The vehicle side slip angle may be modified via turning the front wheels and slipping the vehicle's rear wheels 131.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline operating method, comprising:
   receiving a steering angle and an accelerator pedal position to a controller; and
   adjusting output of a driveline torque source to induce vehicle side slip via the controller in response to the steering angle being greater than a threshold angle and the accelerator pedal position being greater than a threshold position, wherein adjusting the output of the driveline torque source includes increasing the output of the driveline torque source to induce the vehicle side slip.

2. The method of claim 1, where the driveline torque source is a rear drive unit electric machine, the rear drive unit electric machine coupled to a vehicle rear axle.

3. The method of claim 1, where the driveline torque source is an internal combustion engine, and further comprising:
not adjusting the output of the driveline torque source to induce the vehicle side slip via the controller in response to the steering angle being less than the threshold angle.

4. The method of claim 1, further comprising adjusting the output of the driveline torque source via the controller in response to a position of a vehicle on a track.

5. The method of claim 1, further comprising determining a desired vehicle slip angle from the steering angle and the accelerator pedal position and determining a desired axle torque via the controller in response to the vehicle slip angle and the steering angle.

6. The method of claim 5, further comprising filtering the desired axle torque via a low pass filter and a high pass filter and not adjusting the output of the driveline torque source to induce the vehicle side slip via the controller in response to the accelerator pedal position being less than the threshold position.

7. The method of claim 6, further comprising adjusting torque of an internal combustion engine in response to a sum of output of the low pass filter and at least a portion of output of the high pass filter.

8. A driveline operating method, comprising:
receiving a steering angle and an accelerator pedal position to a controller; and
increasing a desired vehicle side slip angle via the controller in response to the steering angle being greater than a threshold angle during a vehicle drift mode, otherwise not increasing the desired vehicle side slip angle in response to the steering angle;
increasing the desired vehicle side slip angle in response to the accelerator pedal position being greater than a threshold position during the vehicle drift mode, otherwise not increasing the desired vehicle side slip angle in response to the accelerator pedal position;
adjusting output of a driveline torque source, during the vehicle drift mode in response to the desired vehicle side slip angle, to a higher output than if a vehicle is not in the vehicle drift mode; and
shifting a transmission in response to a shift schedule, the shift schedule adjusted to shift the transmission at a lower accelerator pedal position than if the vehicle is not in the vehicle drift mode.

9. The method of claim 8, further comprising preselecting a transmission gear in response to the vehicle being in the drift mode and a position of the vehicle on a driving track.

10. The method of claim 8, further comprising increasing a transmission shift shock in response to the vehicle being in the drift mode.

11. The method of claim 10, where the transmission shift shock is increased via decreasing an amount of time for a clutch to close.

12. The method of claim 8, where the driveline torque source is a rear drive unit electric machine.

13. The method of claim 8, where the driveline torque source is an internal combustion engine.

14. The method of claim 8, where the vehicle side slip angle is an angle between the vehicle's actual direction of travel and a direction the vehicle is pointing.

15. A system, comprising:
a vehicle including a steering wheel and an accelerator pedal for receiving input from a human or automated driver;
an engine positioned within the vehicle;
a dual clutch transmission coupled to the engine;
a rear drive unit including a rear axle and an electric machine coupled to the dual clutch transmission via a driveshaft; and
a controller including executable instructions stored in non-transitory memory to:
provide a desired vehicle side slip angle to induce vehicle side slip via adjusting a torque of the electric machine in response to a steering angle input and an accelerator pedal input;
adjust a shift schedule of the transmission to downshift at a lower accelerator pedal position; and
downshift the transmission according to the adjusted shift schedule during the vehicle side slip.

16. The system of claim 15, further comprising additional instructions to determine the desired vehicle side slip angle from a position of the steering wheel, accelerator pedal position, and vehicle position on a closed track.

17. The system of claim 15, further comprising additional instructions to adjust torque output of the engine in response to the desired vehicle side slip angle.

18. The system of claim 15, further comprising additional instructions to determine a desired axle torque from the desired vehicle side slip angle.

19. The system of claim 18, further comprising additional instructions to filter the desired axle torque via a first filter and a second filter.

20. The system of claim 19, further comprising additional instructions to adjust an output torque of the engine in response to output of the first filter and not adjust the output torque of the engine in response to output of the second filter.

* * * * *